Jan. 21, 1936.  H. E. SIPE  2,028,528
METAL FASTENER
Filed July 15, 1932

Harry E. Sipe
INVENTOR

Patented Jan. 21, 1936

2,028,528

UNITED STATES PATENT OFFICE 2,028,528

METAL FASTENER

Harry E. Sipe, New York, N. Y.

Application July 15, 1932, Serial No. 622,601

4 Claims. (Cl. 85—21)

My invention relates to improvements in metallic fasteners, particularly of the drive pin and rivet types and the principal object of the present invention is to provide means for securing metal parts together, such as name plates to machinery, plates of metal together, fittings to pipe in railings and springs to pipe wrench parts.

A further object is to provide a means for quickly and effectively securing metal parts together without the extreme precision commonly necessary and also to engage a drilled or punched hole without necessarily rupturing or disturbing the walls of the hole.

Other objects and advantages of the invention will appear to those skilled in the art upon reading the following specification.

In the accompanying drawing I have shown for purposes of illustration the preferred forms which my invention assumes in practice. In the drawing.

Figure 1:
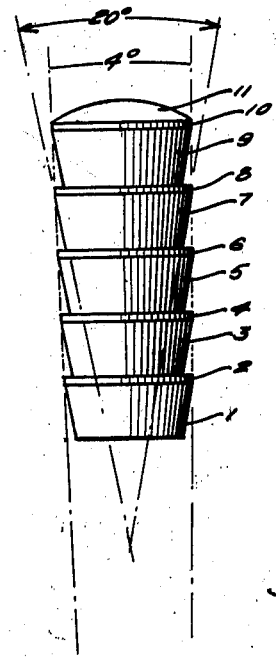
Fig. 1 is a side elevation of a tapered drive pin.

In Fig. 1 a drive pin is shown which is preferably made of cold rolled or carbon steel which is highly resilient and the successive tapers are but slightly inclined. The entire pin is tapered as shown, four degrees, and the successive steps are tapered as shown, twenty degrees. To better explain this the drawing represents an enlargement of a pin adapted to engage a quarter-inch hole and measures at 2 one fourth inch in diameter. The taper at 1 facilitates the introduction of the pin into the hole. The tops of the successive tapers 4, 6, 8, and 10 increase in diameter to .28 inch at 10 which serves as a stop. As the pin is engaged by driving with a hammer the boss 11 prevents damage to the stop 10. As the pin enters the hole the tapers 1, 3, 5, 7, and 9 are successively engaged and with the surfaces 2, 4, 6, 8, and 10 are successively compressed flowing into the successive recesses between 2 and 4, 4 and 6, and 6 and 8 and form a substantially straight smooth faced rod in engagement, the parts of which are under great compression against the side of the hole. This pin being designed especially for use in pipe fittings the head 10 spreads the hole, somewhat, in entering a flush position. A greater taper than that shown would cause shearing of the steps or tapers. Also it is necessary in highly resilient metal that the first step 2 enter the hole easily to prevent the pin from jumping out of the hole when struck.

In all of the pins the smallest diameter of each taper as where the taper 3 joins 2 is of less diameter than the hole to be engaged thus forming, in each case, a recess into which the compressed metal may flow. Also a slight face is left in all cases as at 2, 4, 6, 8, and 10 to make a more substantial edge and to insure more perfect dimension.

Figure 2:
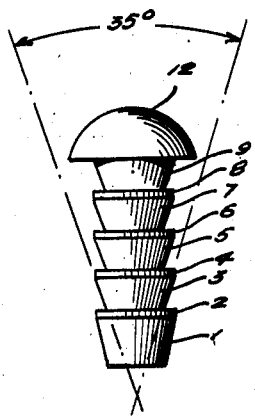
Fig. 2 is a side elevation of a drive rivet.

Fig. 2 is an enlargement of a comparatively sofe metal rivet the material of which is less resilient and therefore requires greater compression to assure a perfect fastening. The taper of the steps best adapted in the case of soft steel is 35 degrees as shown, and represents the greatest taper that can be used without danger of shearing as before referred to. The softness of the metal does not require the entry of the first step into the hole as in the case of more resilient metal. In this case the tapers 1, 3, 5, 7, and 9 successively enter the hole under compression as the rivet is forced into the hole. The smaller diameters of the tapers being of less diameter than the engaged hole diameter, provide a recess in each case into which the compressed metal may flow.

Figure 3:
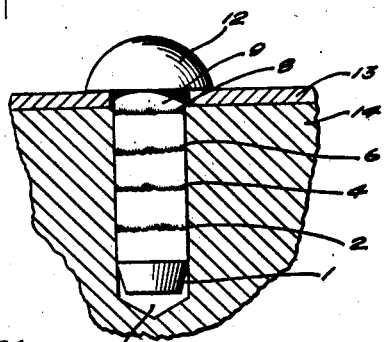
Fig. 3 is a view partly in side elevation and partly in section and shows the contour of the rivet, as shown in Fig. 2, in engagement.

Fig. 3 shows a transverse section of a plate 13 and metal body 14 to which it is attached by the rivet as shown in Fig. 2 driven into the hole 15. This shows the appearance of the rivet after engagement. Lines or shadows showing at 2, 4, 6, and 8 represent the steps pressed against the body of the rivet. This pin or rivet is adapted for use in hardened steel as for the purpose of attaching springs to pipe wrench parts and the engagement depends entirely upon the compression of the rivet.

In every case it is necessary to incline the tapers according to the resilience and compressibility of the metal of which the pin or rivet is made and in all cases lubrication adds greatly to the strength of the engagement. A coating of coal tar paint is very effective and acts as a lubricant as well as oil.

Figure 4:
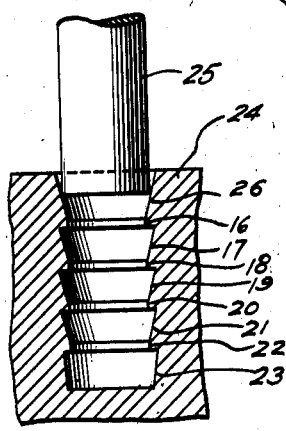
Fig. 4 is a transverse section showing a modification.

Fig. 4 shows a transverse section of a hole in a metal body into which has been machined a series of steps or tapers adapted to act in the same manner in engaging a pin or rod as the steps shown on the pin Fig. 1 or the rivet Fig. 2. A rod is shown at 25 resting against the taper 26 in the block 24. In this position the rod, when driven, successively compresses the smaller circumferences 16, 18, 20, and 22 as it passes over the tapered surfaces 26, 17, 19, and 21. In this case the hole in the metal body is machined with such inclination of the tapered steps as will insure the compression of the walls of the hole as described in the case of the pin and rivet. The metal block 24 may be in the form of a cap adapted to engage the end of a plain rivet or similar device to clamp drilled plates together as the conventional bolt and nut as well as many other forms.

It is provided in all the different designs for the excess metal to flow into the recess adjoining each taper in order that the resistance to engagement be relieved instead of built up and thereby preventing full and proper engagement.

The usual tolerance for small drive fit pins does not exceed .001 inch while in these designs a tolerance of .02 inch is permissible thus insuring perfect engagement where variation occurs in drilling or punching of holes or in pin or rivet dimension.

Various other changes in and modifications of the construction herein shown and described may be made within the scope of the following claims, without departing from the spirit of my invention or sacrificing its advantages.

What I claim as my invention is:

1. In a fastener for metal work a tapered pin member comprising a series of independent deformable conical enlargements, said enlargements progressively increasing in taper from the entering end such that when driven into a hole the side walls of said hole cause successive greater deformation and compression of the respective enlargements due to the progressive increase of taper of said enlargements.

2. A metallic drive fastener for metal work having a driving head and a series of sections each shaped generally like the frustrum of a cone and having substantially the same slope, with the bases positioned toward the head of the fastener so as to furnish flow spaces adjacent the bases for the metal thereof, the base of each section being successively larger in diameter from the entering end of the fastener toward the head, thereby providing an increasing amount of metal at the base of each successive section for deformation and compression into said flow spaces by the side wall of a hole in a metal piece when the fastener is driven into said hole.

3. A metallic drive fastener for metal work as set forth in claim 2, further characterized in that the angle of the slope of the sections and the flow spaces are co-related with the material used, so that when the fastener has been driven into a hole provided, the metal of the fastener is so deformed and compressed as to present substantially a straight smooth faced pin in secure engagement with the wall of the hole.

4. A metallic drive fastener for metal work as set forth in claim 2, further characterized in that the base of each of said sections has a plinth portion locating the boundary of the conical part of the section for the purpose described.

HARRY E. SIPE.